United States Patent

Guo et al.

(10) Patent No.: US 9,648,128 B2
(45) Date of Patent: May 9, 2017

(54) DYNAMIC AD HOC CLOUD BASED MEMORY MANAGEMENT FOR MOBILE DEVICES

(71) Applicant: International Business Machines Corporation, Armonk, NY (US)

(72) Inventors: Shang Q. Guo, Cortlandt Manor, NY (US); Canturk Isci, Secaucus, NJ (US); Jonathan Lenchner, North Salem, NY (US); Maharaj Mukherjee, Poughkeepsie, NY (US); Emmanuel Tong-Viet, Montpellier (FR)

(73) Assignee: International Business Machines Corporation, Armonk, NY (US)

( * ) Notice: Subject to any disclaimer, the term of this patent is extended or adjusted under 35 U.S.C. 154(b) by 380 days.

(21) Appl. No.: 14/187,917

(22) Filed: Feb. 24, 2014

(65) Prior Publication Data

US 2015/0244801 A1    Aug. 27, 2015

(51) Int. Cl.
*G06F 15/16* (2006.01)
*H04L 29/08* (2006.01)
*G06F 15/167* (2006.01)
*G06F 15/177* (2006.01)
*G06F 15/173* (2006.01)

(52) U.S. Cl.
CPC ...... *H04L 67/2852* (2013.01); *H04L 67/2842* (2013.01)

(58) Field of Classification Search
CPC .................................................. H04L 67/1097
USPC ................................ 709/204, 216, 220, 226
See application file for complete search history.

(56) References Cited

U.S. PATENT DOCUMENTS 7,937,091 B2 * 5/2011 Roman ................. H04L 67/104
370/386
8,863,297 B2 * 10/2014 Sharma .......................... 726/26
(Continued)

FOREIGN PATENT DOCUMENTS

JP      2009081877 A    4/2009

OTHER PUBLICATIONS

Bao, Xuan et al., "MoVi: Mobile Phone based Video Highlights via Collaborative Sensing", MobiSys '10, Jun. 15-18, 2010, pp. 357-370.
(Continued)

*Primary Examiner* — Farzana Huq
*Assistant Examiner* — Vitali Korobov
(74) *Attorney, Agent, or Firm* — Stephen J. Walder, Jr.; Kurt P. Goudy (57) ABSTRACT

Mechanisms are provided for generating a dynamically generated ad hoc cloud storage system of mobile devices. A mobile device transmits a request to dynamically generate an ad hoc cloud storage system, to other devices within a local vicinity of the mobile device. Responses are received from the other devices within the local vicinity of the mobile device indicating that a corresponding device is available to participate in the dynamically generated ad hoc cloud storage system. The dynamically generated ad hoc cloud storage system is generated using memory resources of the other devices corresponding to the responses. The mobile device captures recording data and distributes the recording data to the other devices for storage in memory resources of the other devices.

20 Claims, 4 Drawing Sheets

(56) References Cited

U.S. PATENT DOCUMENTS

| | | | |
|---|---|---|---|
| 2008/0294522 A1* | 11/2008 | Teterin | G06Q 30/02 705/14.64 |
| 2010/0069050 A1 | 3/2010 | Akama | |
| 2010/0197345 A1 | 8/2010 | Bawareth | |
| 2011/0028083 A1 | 2/2011 | Soitis | |
| 2011/0306325 A1 | 12/2011 | Gutta et al. | |
| 2011/0306326 A1 | 12/2011 | Reed et al. | |
| 2013/0035116 A1 | 2/2013 | Hymel et al. | |
| 2013/0090961 A1* | 4/2013 | Smith | G06Q 40/00 705/7.11 |
| 2013/0157692 A1 | 6/2013 | Hall et al. | |
| 2013/0262616 A1* | 10/2013 | Kim | H04L 29/08549 709/214 |
| 2014/0045446 A1* | 2/2014 | Assuncao | H04M 3/5116 455/404.1 |
| 2014/0101781 A1* | 4/2014 | Bouknight | G06F 21/10 726/28 |
| 2015/0135258 A1* | 5/2015 | Smith | G06F 21/45 726/1 |
| 2015/0373108 A1* | 12/2015 | Fleming | H04L 67/18 709/213 |
| 2016/0226972 A1* | 8/2016 | Mahankali | H04W 8/18 |

OTHER PUBLICATIONS

Keller, Lorenzo et al., "HotMobile 2012 Demo: MicroCast: Cooperative Video Streaming on Smartphones", Extended Abstract, 2012, 2 pages.

Keller, Lorenzo et al., "MicroCast: Cooperative Video Streaming on Smartphones", MobiSys'12, Jun. 25-29, 2012, 43 pages.

Keller, Lorenzo et al., "MicroCast: Cooperative Video Streaming on Smartphones", Proceedings of the 10th International Conference on Mobile Systems, Applications and Services (MobiSys'12), Jun. 25-29, 2012, pp. 57-70.

Lahti, Janne et al., "A Mobile Phone-based Context-aware Video Management Application", Proceedings of the SPIE, 2006, vol. 6074, pp. 204-215.

Pussep, Konstantin et al., "Cooperative Traffic Management for Video Streaming Overlays", Computer Networks: The International Journal of Computer and Telecommunications Networking, 56(3): 1118-11130, 2012.

\* cited by examiner

DYNAMIC AD HOC CLOUD BASED MEMORY MANAGEMENT FOR MOBILE DEVICES

BACKGROUND

The present application relates generally to an improved data processing apparatus and method and more specifically to mechanisms for dynamic ad hoc cloud based memory management for mobile devices.

Modern mobile devices, e.g., mobile telephones, smart phones, tablet computing devices, and the like, often include recording equipment for recording video, audio, or a combination of video and audio content, as well as other types of multi-media recordings. Typically, the recording equipment may include one or more of a video camera, a microphone, inputs for connecting additional recording equipment, lighting equipment, or the like, to assist with the generation of such recordings. The recordings themselves are often stored as one or more data files in a memory or storage device of the mobile device.

The memories of such mobile devices are limited with regard to storage capacity and/or storage capacity dedicated to the storage of recordings generated by the recording equipment. As a result, it is often the case that such mobile devices may, during a recording operation, approach or exceed the storage capacity of the memory of that particular mobile device, i.e. the mobile device runs out of memory for storing the recording while the recording is being performed. For example, a user of a mobile phone may utilize the mobile phone's recording equipment (video camera, microphone, and corresponding software executing on the mobile device), to record a performance or other event. While recording the performance or event, the memory of the mobile device may become full and thus, the user is not able to record the entirety of the performance or event that the user wishes to record. As a result, recording content is missed or lost due to the inability to store the recording content in within the available capacity of the memory of the mobile device.

One solution is to increase the memory of the mobile device. However, even though memory devices themselves are becoming increasingly less costly to provide, and newer mobile devices are often equipped with larger memories, the need for still greater amounts of memory is ever increasing, especially with the advent of high definition video, three dimensional video recordings, and the like, which generate larger size files for storage.

Moreover, individuals often under estimate the memory requirements of their mobile devices while recording a performance or event, or are not cognizant of the remaining storage in their mobile device. In such cases, for example, a user may record an event at the highest definition settings available to the device when, if they had known of the memory limitations, a lower definition setting may stretch the recording capability of the mobile device for some time longer. Thus, again, individuals often face a situation while recording a performance that they are running out of memory in their mobile device and may miss valuable moments of a performance or event while changing out their storage device, e.g., SD card or other storage device, if they are even able to switch out storage devices.

SUMMARY

In one illustrative embodiment, a method for providing a dynamically generated ad hoc cloud storage system of mobile devices is provided. The method comprises transmitting, by the mobile communication device, a request to dynamically generate an ad hoc cloud storage system, to mobile devices within a local vicinity of the mobile communication device. The method further comprises receiving, by the mobile communication device, one or more responses from the mobile devices within the local vicinity of the mobile communication device. The one or more responses indicate that a corresponding mobile device is available to participate in the dynamically generated ad hoc cloud storage system. The dynamically generated ad hoc cloud storage system is generated using memory resources of one or more mobile devices corresponding to the one or more responses. The method further comprises capturing, by the mobile communication device, recording data corresponding to a recording of a real-time event and distributing the recording data to the one or more mobile devices for storage in memory resources of the one or more mobile devices.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

The illustrative embodiments provide mechanisms for location specific dynamic ad hoc cloud based memory management for mobile devices. A "mechanism," as used herein, may be an implementation of the functions or aspects of the illustrative embodiments in the form of an apparatus, a procedure, or a computer program product. The mechanisms described herein may be implemented as specialized hardware, software executing on general purpose hardware, software instructions stored on a medium such that the instructions are readily executable by specialized or general purpose hardware, a procedure or method for executing the functions, or a combination of any subset of the above.

The term "cloud storage" as used herein refers to a service in which data is maintained, managed, and backed up remotely and made available via one or more data networks. In the context of the present description, the "cloud storage" refers to a service that provides storage capacity by aggregating one or more storage devices or remotely located computing systems to provide a storage location for data that is not able to be stored in a local storage of a mobile device.

The term "ad hoc", which is a Latin phrase meaning "for this", as used herein refers to a solution for a specific circumstance rather than a generalized solution that is able to be adapted to other circumstances or purposes. Thus, an "ad hoc" cloud storage device is a cloud storage device that is created and used for the specific circumstance at the time that the cloud storage device is created. The illustrative embodiments provide a dynamically created ad hoc cloud storage mechanism where the cloud storage mechanism is created dynamically in response to detected conditions and is used specifically for the particular conditions and situation at the time when the cloud storage mechanism is created.

With the mechanisms of the illustrative embodiments, the mobile devices within a local vicinity of one another are dynamically combined into a local ad hoc cloud storage system in which storage of recording files may be distributed across the plurality of mobile devices making up the dynamically generated ad hoc cloud storage system. That is, the mobile devices that are part of the dynamically generated ad hoc cloud storage system, pool their memory such that the combined memory may be utilized as needed by the mobile devices that are participating in the dynamic ad hoc cloud storage system. Such use of a dynamically generated ad hoc cloud storage system may be performed in response to a determination that a previously configured wide area network cloud service is not available or a data connection to such a wide area network cloud services is not available, e.g., the mobile device does not have a sufficiently strong wireless connection such as a Cellular, 3G/4G/5G network connection, Wi-Fi network connection, or the like.

Mobile devices that may be utilized with the dynamic ad hoc cloud storage system service of the illustrative embodiments are configured to share a specified portion of their memory resources with other mobile devices in a dynamic ad hoc cloud storage system when conditions arise calling for such a dynamic ad hoc cloud storage system to be generated. The mobile devices may register with a dynamic ad hoc cloud storage system service, download appropriate software to the mobile devices to facilitate the dynamic ad hoc cloud storage system generation and utilization, and may be configured with regard to the amount of memory allocated to dynamic ad hoc cloud storage, encryption keys, and other configuration parameters for use when the dynamic ad hoc cloud storage system service is implemented. Such downloading of software and configuring of the mobile device may be performed prior to the need to implement the dynamic ad hoc cloud storage system service during recording of a performance or other real-time event and may configure the mobile device for sending requests for generation of a dynamic ad hoc cloud storage system and responding to received requests for the generation of dynamic ad hoc cloud storage systems.

Once registered and configured to utilize the dynamic ad hoc cloud storage system service of the illustrative embodiment, the mobile device may invoke the dynamic ad hoc cloud storage system service when performing a recording operation. Such initiation of the dynamic ad hoc cloud storage system service may be performed manually through the user selection of a corresponding option via a graphical user interface of the mobile device, automatically in response to a particular event or condition, e.g., amount of available recording storage space falling below a predetermined threshold, or the like. The initiation of the dynamic ad hoc cloud storage system service causes a determination to be made by the logic executing on the mobile device as to whether the mobile device has a data communication connection available for uploading recording data to a remote cloud storage system. This determination may require a particular type of data communication connection, e.g., WiFi connection, cellular connection, data communication connection with a predetermined bandwidth size, or the like, to avoid excessive fees from service providers and/or avoid unsatisfactory performance. If the requisite data communication connection is not available, then a dynamic ad hoc cloud storage system generation operation may be initiated. If the data communication connection is available, then the mobile device may initiate uploading of recording data to a remote storage system via the available data communication connection. Alternatively, the dynamic ad hoc cloud storage system service may initiate generation of a dynamic ad hoc cloud storage without performing such a determination.

Assuming that a dynamic ad hoc cloud storage system is to be generated, identification of other mobile devices available to operate as part of the dynamic ad hoc cloud storage system is performed. This identification may involve identifying which other mobile devices that have been previously registered as participants in the dynamic ad hoc cloud storage system service, are present within a local vicinity of the mobile device initiating the generation of the dynamic ad hoc cloud storage system. The "local vicinity" may be measured in accordance with the particular localized wireless communication type being utilized, e.g., Bluetooth, WiFi, infrared communication, or the like. Thus, a "local vicinity" corresponds to the range of the particular communication protocol being utilized.

The identification of which mobile devices are within this local vicinity may be performed by the mobile device broadcasting a request to other mobile devices within the local vicinity using the particular communication protocol and receiving response messages back from these other mobile devices. Only those mobile devices that have been previously registered with the dynamic ad hoc cloud storage system service and configured with corresponding device profiles, configuration settings or downloaded software for performing dynamic ad hoc cloud storage system generation may respond to the request message and may respond with identification information. Alternatively, the mobile device initiating the generation of the dynamic ad hoc cloud storage system generation operation may send a request to a remote server via a wide area communication network, e.g., cellular network, WiFi connection, or the like, requesting that the remote server identify the mobile devices in the local vicinity and coordinate the generation of the dynamic ad hoc cloud storage system. In such an embodiment, the remote server may identify the mobile devices within the local vicinity using any suitable location mechanism, such as global positioning system (GPS) mechanisms associated with the mobile devices, cellular network triangulation mechanisms, or the like.

Once the mobile devices that are within the local vicinity of the initiating mobile device are identified, which can be used as part of the dynamic ad hoc cloud storage system, a hierarchical ad hoc cloud storage system is generated using the identified mobile devices by assigning various mobile devices to different roles of one or more small localized ad hoc cloud storage systems. For example, a localized ad hoc cloud storage system may have a designated size of a particular predefined number of mobile devices to make the ad hoc cloud storage systems more manageable and more responsive for recording data storage. Each ad hoc cloud storage system may have a mobile device that is a member of that ad hoc cloud storage system designated a cloud leader, with the assignment of the cloud leader being performed using any suitable methodology, e.g., based on a random selection, a pseudo-random selection taking into account the last time each device was selected to be a cloud leader, a selection process based on storage capacity, processing capacity, or other operational parameters of the various devices (e.g., a device having the least available storage capacity may be selected as a cloud leader rather than a participant that provides storage for the cloud storage system), or any other methodology for selecting a cloud leader.

In addition, one or more mobile devices local to the initiating mobile device may be designated as a dispatcher and/or backup dispatcher, again with the selection of the dispatcher following any suitable selection methodology including those described above or other methodologies deemed appropriate for the implementation. The dispatcher may be responsible for obtaining recording data from the initiating mobile device and dispatch this recording data to one or more corresponding cloud leaders. The cloud leaders are responsible for managing the mobile devices within their corresponding local ad hoc cloud storage system and distributing recording data to the mobile devices within their local ad hoc cloud storage system. Thus, a hierarchical dynamically generated ad hoc cloud storage system is generated comprising dispatchers, cloud leaders, and one or more small cloud storage systems associated with the cloud leaders, the small cloud storage systems comprising one or more mobile devices as members of the small cloud storage system.

It should be appreciated that while it is assumed that separate dispatchers and cloud leader mobile devices are utilized, the illustrative embodiments are not limited to such. Rather, a single mobile device may operate as both a dispatcher and a cloud leader in some embodiments. Moreover, in some embodiments, the initiating mobile device may also operate as one or more of a dispatcher and/or a cloud leader. The particular implementation may be determined based on the number of mobile devices participating in the dynamic ad hoc cloud storage system, for example. As an example, if the event being recorded is a school play, the number of mobile devices participating in the dynamic ad hoc cloud storage system may be relatively small compared to the recording of a sporting event, e.g., a professional football game, and thus, different organizations of mobile devices may be used for different events based on the number of mobile devices involved.

The recording data itself is generated by the recording equipment of the initiating mobile device. The recording data is segmented into small segments, optionally having a fixed size, a variable size less than a predetermined threshold size, or the like. These segments of recording data may be encrypted and indexed. The indexing may comprise the use of a sequential index value, a timestamp, or any other index that is suitable for recombining the various segments in a proper order so as to recreate the entire recording generated by the recording equipment of the initiating mobile device. As a segment of recording data is generated and reaches a point where the segment is ready to be distributed to the dynamically generated ad hoc cloud storage system, the initiating mobile device may store the segment in a portion of memory from which the segment is transmitted to a dispatcher mobile device. This may be done repeatedly while the initiating mobile device continues to record the event and generate subsequent segments of recording data until the recording is completed.

The dispatcher receives the segment of recording data transmitted by the initiating mobile device and sends the segment to one of the available cloud leaders of the dynamically generated ad hoc storage system. If multiple cloud leaders are available, the dispatcher may make use of any suitable selection logic for selecting to which cloud leader to send the segment, e.g., a round robin approach, monitoring the number of segments sent to each cloud leader and selecting a cloud leader based on the number of segments sent to each cloud leader, or the like. The cloud leader selects a mobile device in its corresponding small cloud storage system to store the segment. The cloud leader may maintain information for each of the mobile devices with regard to the amount of memory each mobile device has available to store segments, whether a mobile device's memory is full and cannot continue to participate, or the like. The mobile devices themselves may implement logic for storing the segments in the allocated portions of their memory for use in ad hoc cloud storage systems and which may report to the cloud leader when this portion of memory becomes full.

In addition to logic for storing the segments of recorded data transmitted to them, and for reporting memory availability to the cloud leader, the mobile devices of the small ad hoc cloud storage systems may also comprise logic for determining when a data connection is available for uploading the segments to a remote server of the dynamic ad hoc cloud storage system service for retrieval by the initiating mobile device. If such a connection is available, then the mobile device may initiate upload of the segments stored in the allocated portion of the mobile device's memory that stores these segments. If such a connection is not available, then the segments may be maintained in the allocated memory of the mobile device until such a connection is available.

At the remote server of the dynamic ad hoc cloud storage system service, the server collects the various segments of recording data and compiles them into a single recording data file, or series of data files, arranged in accordance with the indexes of the segments so as to place the segments back into a correct chronological order of the recording. Once all of the segments are compiled in this manner, the remote server may notify the initiating mobile device that the complete recording is available for download. Since the segments are encrypted by the initiating mobile device, the initiating mobile device may decrypt the compiled segments to obtain access to the entire recording.

Thus, a recording having a data size greater than can be stored in the local memory of the initiating mobile device may be generated by utilizing the combined storage capacity of the mobile devices of the dynamically generated ad hoc cloud storage system. Hence the available memory of the initiating mobile device is no longer a limitation to the recording size and does not result in loss of content of a recording due to an insufficiency of the local memory of the initiating mobile device. Security of the recording data may be maintained by way of encryption and/or other security measures to ensure that while the recording data may be temporarily distributed to multiple mobile devices, only the initiator of the recording may be able to access the recording data after it has been compiled at the dynamic ad hoc cloud storage system service's server computing device.

It should be appreciated that while the data of the recording is distributed to the memories of the devices participating in the dynamic ad hoc cloud storage system, ownership of the data remains with the original mobile device performing the recording operation. This ownership is ensured through encryption of the portions of recording data that are temporarily distributed to the other mobile devices for ad hoc cloud storage system storage. Thus, while these other mobile devices may temporarily have physical possession of the portion of recording data, the mobile device does not have ownership of the portion of recording data and cannot access the encrypted recording data. The original mobile device performing the recording is the only entity able to decrypt the recording data after it has been recompiled and thus, ownership remains with the original mobile device during the entire dynamic ad hoc cloud storage system operation.

It should further be appreciated that various incentives may be offered to participants in dynamic ad hoc cloud storage systems to reward or entice owners of mobile devices to participate in the dynamic ad hoc cloud storage systems or to reward/entice owners of mobile devices to increase their participation in such dynamic ad hoc cloud storage systems, e.g., by increasing the amount of memory their corresponding mobile device contributes to the dynamic ad hoc cloud storage system. The various rewards/incentives may take many forms including, for example, financially charging the owner of the originating mobile device initiating the generation and usage of the dynamic ad hoc cloud storage system a fee for the service and then apportioning a part of that fee to the owners of the mobile devices participating in the dynamic ad hoc cloud storage system. The amount of apportionment may be based on the role of the mobile device in the dynamic ad hoc cloud storage system, e.g., cloud leader, distributor, participant, or the like, a level of involvement in the ad hoc cloud storage system, e.g., an amount of memory allocated to the ad hoc cloud storage system by the particular mobile device, or the like.

It should also be appreciated that there may be times when multiple mobile devices in a local proximity to one another are attempting to make use of the same dynamic ad hoc cloud storage system services of the illustrative embodiments. Thus, demands for mobile devices to participate in multiple dynamic ad hoc cloud storage systems may be received for a same event being recorded. It should be noted that though several mobile devices may be recording the same event, the recording in each of the individual devices may be different from one another based on the interest of the person using the device, the position and the location of the recording device as well as the characteristics of the device itself. In such situations various methodologies may be utilized to arbitrate the competition for mobile device memory resources for use in the dynamic ad hoc cloud storage systems. For example, in one illustrative embodiment, an auction may be utilized to auction off the memory resources to an originating mobile device based on a specified level of financial compensation the owner of the originating mobile device is willing to pay for the memory resources of the mobile devices. Alternatively, such auctioning may be based on a specified need level of the originating mobile device, e.g., mobile devices requiring greater memory resources may be given dynamic ad hoc cloud storage system resources prior to originating mobile devices requiring less memory resources. Various other prioritization mechanisms may also be utilized, e.g., based on a specified account type of a user that owns the originating mobile device, or the like.

The above aspects and advantages of the illustrative embodiments of the present invention will be described in greater detail hereafter with reference to the accompanying figures. It should be appreciated that the figures are only intended to be illustrative of exemplary embodiments of the present invention. The present invention may encompass aspects, embodiments, and modifications to the depicted exemplary embodiments not explicitly shown in the figures but would be readily apparent to those of ordinary skill in the art in view of the present description of the illustrative embodiments.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
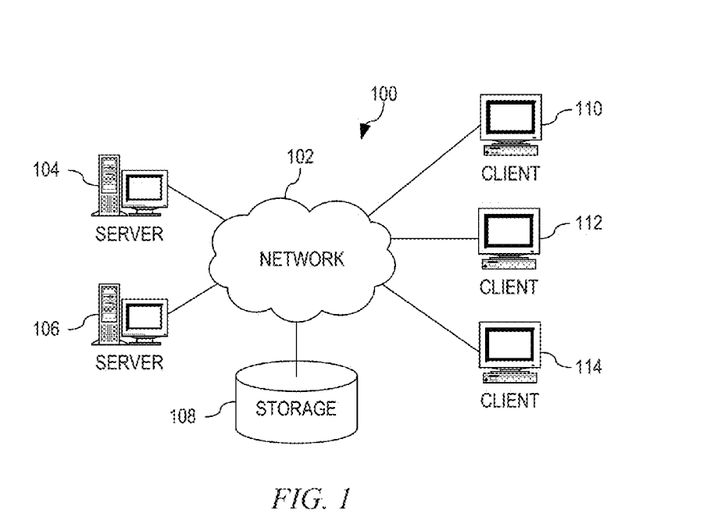
FIG. 1 is an example diagram of a distributed data processing system in which aspects of the illustrative embodiments may be implemented.
Figure 2:
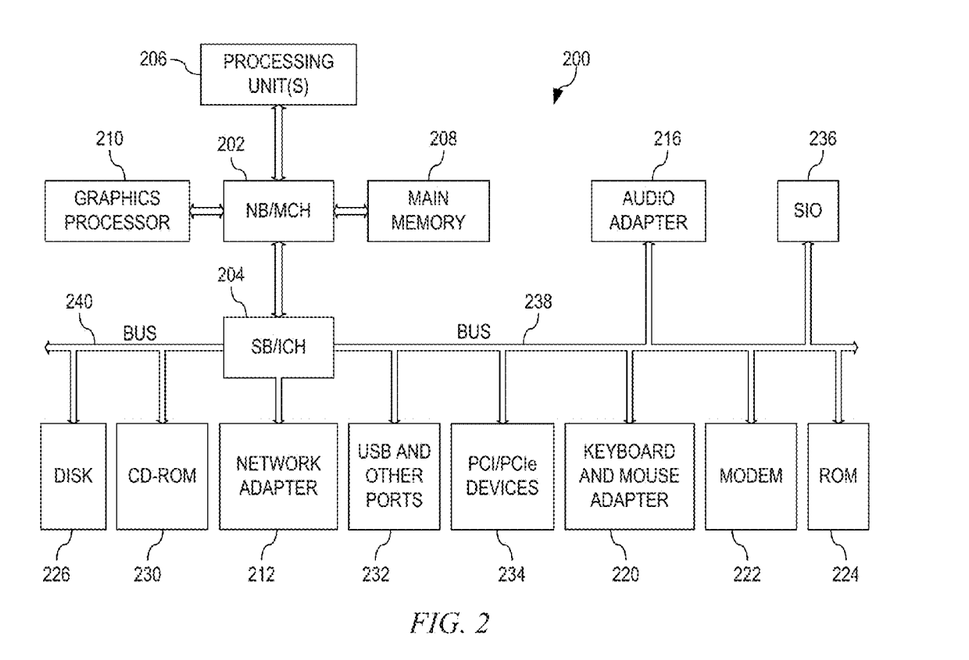
FIG. 2 is an example block diagram of a computing device in which aspects of the illustrative embodiments may be implemented.

The illustrative embodiments may be utilized in many different types of data processing environments. In order to provide a context for the description of the specific elements and functionality of the illustrative embodiments, FIGS. 1 and 2 are provided hereafter as example environments in which aspects of the illustrative embodiments may be implemented. It should be appreciated that FIGS. 1 and 2 are only examples and are not intended to assert or imply any limitation with regard to the environments in which aspects or embodiments of the present invention may be implemented. Many modifications to the depicted environments may be made without departing from the spirit and scope of the present invention.

FIG. 1 depicts a pictorial representation of an example distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

FIG. 2 is a block diagram of an example data processing system in which aspects of the illustrative embodiments may be implemented. Data processing system 200 is an example of a computer, such as client 110 in FIG. 1, in which computer usable code or instructions implementing the processes for illustrative embodiments of the present invention may be located.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft® Windows 7®. An object-oriented programming system, such as the Java™ programming system, may run in conjunction with the operating system and provides calls to the operating system from Java™ programs or applications executing on data processing system 200.

As a server, data processing system 200 may be, for example, an IBM® eServer™ System p® computer system, running the Advanced Interactive Executive (AIX®) operating system or the LINUX® operating system. Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device that is configured with flash memory to provide non-volatile memory for storing operating system files and/or user-generated data, for example. Essentially, data processing system 200 may be any known or later developed data processing system without architectural limitation.

With reference again to FIG. 1, one or more of the client computing devices 110-114 may be implemented as mobile communication devices and the network 102 may comprise a cellular or other wide area wireless communication network, such as a 3G or 4G mobile communication network for example, in addition to a wide area data network, such as the Internet. One or more of the servers 104, 106 may operate as a server for providing a dynamic ad hoc cloud storage system service with which the client devices 110-114 may register to participate in the dynamic ad hoc cloud storage system service as well as download software for implementing such a dynamic ad hoc cloud storage system service on the client device 110-114. The registration of the client devices 110-114 involves the users of the client devices 110-114 agreeing to the terms and conditions for becoming a registered member of the dynamic ad hoc cloud storage system service, configuring the client device's specific participation parameters, e.g., an amount of memory that the user of a client device 110-114 agrees to allocate for use in providing dynamic ad hoc cloud storage to other client devices 110-114 participating in the dynamic ad hoc cloud storage system service, and the like.

In addition, the dynamic ad hoc cloud storage system service provider server 104, 106 may also provide services for collecting and correlating the recording segments of a dynamic ad hoc cloud storage system for remote storage and eventual access by the initiator of the recording. In some illustrative embodiments, the collected and correlated recording segments may be stored as a combined recording data file, or files, in a network attached storage, such as storage 108, or in a storage associated with the server 104, 106. As noted above, the dynamic ad hoc cloud storage system server may be implemented as a data processing system such as shown in FIG. 2, or other type of known computer hardware architecture, which is augmented to include the mechanisms of the illustrative embodiments. The client devices 110-114 may be any type of generally known mobile communication device that may be augmented to include the mechanisms of the illustrative embodiments.

Figure 3:
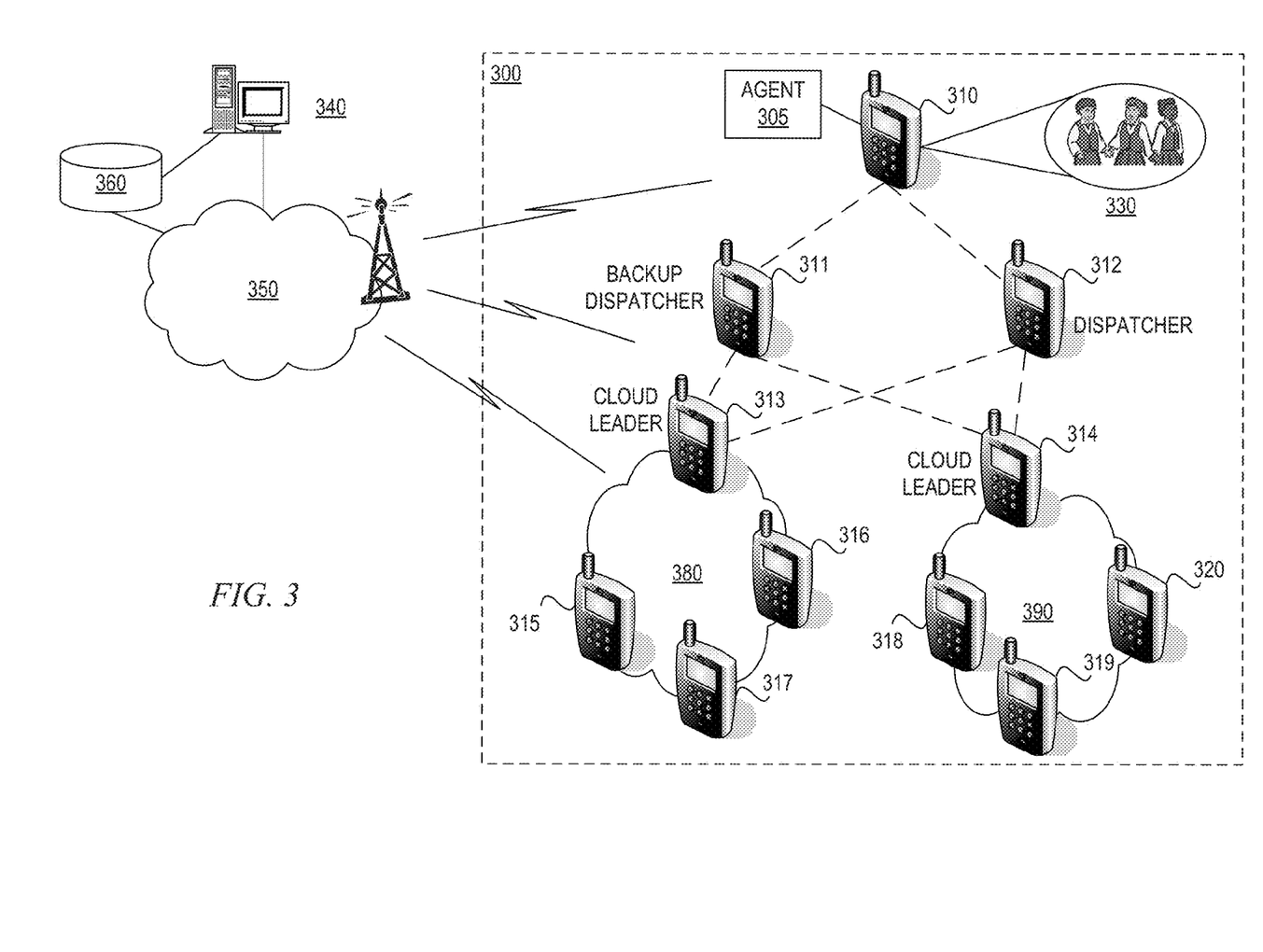
FIG. 3 is an example block diagram of the primary operational elements according to one illustrative embodiment.

FIG. 3 is an example block diagram of the primary operational elements according to one illustrative embodiment. As shown in FIG. 3, the primary operational elements include a plurality of mobile devices 310-320 which are all present within a local vicinity 300 of each other. The local vicinity 300 may be measured by a maximum range of a short distance wireless communication protocol/mechanism. For example, if a Bluetooth communication protocol/mechanism is being used for local wireless communication directly between mobile devices 310-320, then the local vicinity 300 is measured by the range of the Bluetooth communication mechanism.

In the depicted example, it is assumed that mobile device 310 is involved in recording an event 330, e.g., a performance, sporting event, home movies of a family gathering, or any other real-time event capable of being captured by audio/video recording equipment and software present in the mobile device 310. One or more of the other mobile devices 311-320 may also be engaged in recording operations, which may be performed in parallel with the recording operation and use of a dynamic ad hoc cloud storage system in accordance with the illustrative embodiments. However, for purposes of this description, only the recording operation and use of the dynamic ad hoc cloud storage system with regard to mobile device 310 will be described for simplicity.

Mobile devices 310-320, in order to be utilized with the dynamic ad hoc cloud storage system service of the illustrative embodiments, register with a dynamic ad hoc cloud storage system service provider via the server 340. For example, the mobile devices 310-320 may, when able to access the wide area data network 370, e.g., the Internet, via a high bandwidth connection, e.g., WiFi hotspot, wireless to wired network connection, wired network such as via a docking cradle, or the like, may communicate with the server 340 to initiate the registration process. Alternatively, a user may utilize a computing device to register with the dynamic ad hoc cloud storage system service provider's server 340 and input the necessary information for identifying the mobile device 310-320.

As part of the registration process, the mobile devices 310-320 are configured to share a specified portion of their memory resources with other mobile devices 310-320 in a dynamic ad hoc cloud storage system when conditions arise calling for such a dynamic ad hoc cloud storage system to be generated. The amount of memory resources that are shared with other mobile devices 310-320 may be specified by a user of the mobile device being registered with various levels of memory resources being correlated with corresponding rewards/incentives to be provided to the user of the registered mobile device. That is, if a user agrees to share a larger amount of their memory resources of their mobile device, then the reward/incentive may be relatively larger than other users that agree to share a lower amount of their memory resources of their mobile devices.

The mobile devices may register with a dynamic ad hoc cloud storage system service via an interface of the server 340, may download appropriate software to the mobile devices 310-320 to facilitate the dynamic ad hoc cloud storage system generation and utilization, and may be configured with regard to the amount of memory allocated to dynamic ad hoc cloud storage, encryption keys, and other configuration parameters for use when the dynamic ad hoc cloud storage system service is implemented. Such downloading of software and configuring of the mobile device 310-320 may be performed prior to the need to implement the dynamic ad hoc cloud storage system service during recording of the real-time event 330 and may configure the mobile device 310-320 for sending requests for generation of a dynamic ad hoc cloud storage system and responding to received requests for the generation of dynamic ad hoc cloud storage systems. The registration process may involve the establishment of an account with the server 340 that is associated with a particular user, a particular mobile device, or the like. The account may include additional information including personal information for the user of the mobile device, information for providing rewards/incentives to the user of the mobile device in exchange for the sharing of the mobile device's memory resources, contact information for the user and the mobile device, and/or the like. While it is assumed that a mobile device registered to utilize the dynamic ad hoc cloud storage system service via the server 340 will also share its memory resources with other mobile devices 310-320, this is not required and a user of a mobile device may register as a user of the service but not a participant in other mobile device's dynamic ad hoc cloud storage systems. In such a case, the user will not be rewarded or given any incentives since his/her mobile device will not participate in the dynamic ad hoc cloud storage system as a device sharing its memory resources. In some embodiments, users that register their devices as only originating mobile devices rather than participants may actually be charged a higher fee for use of the service.

Once registered and configured to utilize the dynamic ad hoc cloud storage system service of the illustrative embodiment, the mobile device 310 may invoke the dynamic ad hoc cloud storage system service when performing a recording operation. Such initiation of the dynamic ad hoc cloud storage system service may be performed manually through the user selection of a corresponding option via a graphical user interface of the mobile device 310, automatically in response to a particular event or condition, e.g., amount of available recording storage space falling below a predetermined threshold, or the like. For example, the user of the mobile device 310 may initiate recording of the event 330 and the dynamic ad hoc cloud storage system service application or agent 305 of the mobile device 310 may monitor the utilization of memory resources of the mobile device 310 during the recording to determine an available amount of memory resources. When the amount of available memory resources of the mobile device 310 reaches a particular threshold amount of memory resources, e.g., 10% memory availability, the dynamic ad hoc cloud storage system generation may be automatically initiated. Alternatively, the dynamic ad hoc cloud storage system generation may be initiated in response to initiating recording of the event 330, in response to a user selecting a graphical user interface option displayed on the mobile device 310 for initiating the generation of the dynamic ad hoc cloud storage system, or the like.

The initiation of the dynamic ad hoc cloud storage system service causes the agent 305 to determine whether the mobile device 310 has a data communication connection, such as via network 350, available for uploading recording data to a remote storage system 360, which may be associated with the server 340. That is, this determination is to determine whether the mobile device 310 can upload recording data to a remote storage system rather than having to dynamically generate an ad hoc cloud storage system using the mobile devices 310-320 in the local vicinity 300. This determination may require a particular type of data communication connection, e.g., WiFi connection, cellular connection, data communication connection with a predetermined bandwidth size, or the like, to avoid excessive fees from service providers and/or avoid unsatisfactory performance. If the requisite data communication connection is not available, then a dynamic ad hoc cloud storage system generation operation may be initiated by the agent 305. If the data communication connection is available, then the mobile device 310 may initiate uploading of recording data to the remote storage system 360 via the available data communication connection to network 370. Alternatively, the agent 305 may initiate generation of a dynamic ad hoc cloud storage system without performing such a determination.

The agent 305 of the mobile device 310 may initiate the generation of the dynamic ad hoc cloud storage system by broadcasting a message to other mobile devices 311-320 in the local vicinity 300 of the initiating mobile device 310, e.g., a Bluetooth message may be transmitted to the other mobile devices 311-320, requesting that mobile devices 311-320 configured to participate in dynamic ad hoc cloud storage systems respond with identification information. Only those mobile devices 311-320 that have been previously registered with the dynamic ad hoc cloud storage system service, via server 340 for example, and configured with corresponding downloaded software agents (not shown) for performing dynamic ad hoc cloud storage system generation may respond to the request message and may respond with identification information. Alternatively, the mobile device 310 initiating the generation of the dynamic ad hoc cloud storage system generation operation may send a request to the remote server 340 via a wide area communication network 370 if available, requesting that the remote server 340 identify the mobile devices in the local vicinity 300 and coordinate the generation of the dynamic ad hoc cloud storage system. In such an embodiment, the remote server 340 may identify the mobile devices 311-320 within the local vicinity 300 using any suitable location mechanism, such as global positioning system (GPS) mechanisms associated with the mobile devices 311-320, cellular network triangulation mechanisms, or the like.

Once the mobile devices 311-320, which can be used as part of the dynamic ad hoc cloud storage system, that are within the local vicinity 300 of the initiating mobile device 310 are identified, a hierarchical ad hoc cloud storage system is generated using the identified mobile devices 311-320 by assigning various mobile devices 311-320 to different roles of one or more small localized ad hoc cloud storage systems 380, 390. As previously mentioned, the assignment of mobile devices 311-320 to various roles within the corresponding hierarchical ad hoc cloud storage system may be done using any appropriate or suitable methodology for the particular implementation, e.g., based on a random selection, a pseudo-random selection taking into account the last time each device was selected to be a cloud leader, a selection process based on storage capacity, processing capacity, or other operational parameters of the various devices (e.g., a device having the least available storage capacity may be selected as a cloud leader rather than a participant that provides storage for the cloud storage system), based on a distance metric representing the physical distances between mobile devices, or any other methodology for selecting a cloud leader.

For example, a small localized ad hoc cloud storage system may have a designated size of a particular predefined number of mobile devices, e.g., 4 mobile devices, to make the ad hoc cloud storage systems more manageable and more responsive for recording data storage. Each small localized ad hoc cloud storage system 380, 390 may have a mobile device 313, 314 that is a member of that ad hoc cloud storage system 380, 390 but is designated a cloud leader or controller. In addition, one or more mobile devices 311, 312 local to the initiating mobile device 310 may be designated as a dispatcher and/or backup dispatcher. The dispatcher 312 may be responsible for obtaining recording data from the initiating mobile device 310 and dispatch this recording data to one or more corresponding cloud leaders 313, 314. The cloud leaders 313, 314 are responsible for managing the mobile devices 315-320 within their corresponding local ad hoc cloud storage system 380, 390 and distributing recording data to the mobile devices 315-320 within their local ad hoc cloud storage system 380, 390. Thus, a hierarchical dynamically generated ad hoc cloud storage system comprising all of mobile devices 310-320 of the local vicinity 300 is generated comprising dispatchers 311-312, cloud leaders 313-314, and one or more small ad hoc cloud storage systems 380, 390 associated with the cloud leaders 313-314, the small ad hoc cloud storage systems 380, 390 comprising one or more mobile devices 315-320 as members of the small ad hoc cloud storage system 380, 390.

As previously mentioned above, it should be appreciated that while it is assumed that separate dispatchers 311-312 and cloud leader mobile devices 313-314 are utilized, the illustrative embodiments are not limited to such. Rather, a single mobile device, e.g., mobile device 312, may operate as both a dispatcher and a cloud leader in some embodiments. Moreover, in some embodiments, the initiating mobile device 310 may also operate as one or more of a dispatcher and/or a cloud leader. The particular implementation may be determined based on the number of mobile devices participating in the dynamic ad hoc cloud storage system, for example. As an example, if the event 330 being recorded is a school play, the number of mobile devices participating in the dynamic ad hoc cloud storage system may be relatively small compared to the recording of a sporting event, e.g., a professional football game, and thus, different organizations of mobile devices may be used for different events based on the number of mobile devices involved.

The mobile device 310 performs recording operations for recording the event 330, using video and audio capture devices and software of the mobile device 310, and segmenting the recording data into small size segments for distribution to mobile devices 311-320 of the dynamic ad hoc cloud storage system. The small segments of recording data may be of a fixed size or may be of a variable size less than a predetermined threshold size, for example. These segments of recording data may be encrypted and indexed using a monotonically increasing segment identifier, timestamps, or any other index value useable for recreating a chronological order of the small size segments. A unique recording identifier may also be associated with each of the segments so as to identify what recording all of the segments belong to. Thus, a recording segment may comprise the recording data, a recording identifier, and a segment index to specify where in the recording, identified by the recording identifier, the recording data of the segment belongs chronologically.

As a segment of recording data is generated and reaches a point where the segment is ready to be distributed to the dynamically generated ad hoc cloud storage system, e.g., reaches the fixed or maximum size, the initiating mobile device 310 may store the segment in a portion of memory of the mobile device 310 from which the segment is transmitted to a dispatcher mobile device 312. This may be done repeatedly while the initiating mobile device 310 continues to record the event and generate subsequent segments of recording data until the recording is completed. Each subsequent segment will have a corresponding index for identifying its specific location within the order of segments of the recording so that the complete recording may be later compiled by ordering the segments in accordance with the indices of the segments. If the dispatcher mobile device 312 is not available, the backup dispatcher mobile device 311 may be used to perform the dispatching of recording segments.

The dispatcher, or backup dispatcher, 311-312 receives the segment of recording data transmitted by the initiating mobile device 310 using the close range localized data communication protocol/mechanisms, e.g., Bluetooth communication, and sends the segment to one of the available cloud leaders 313, 314 of the dynamically generated ad hoc storage system. If multiple cloud leaders 313, 314 are available, the dispatcher 312, or backup dispatcher 311, may make use of any suitable selection logic for selecting to which cloud leader 313, 314 to send the segment, e.g., a round robin approach, monitoring the number of segments, segment sizes, and the like, sent to each cloud leader and selecting a cloud leader based on the number of segments, segment sizes, etc. sent to each cloud leader 313, 314, or the like. The cloud leader, e.g., cloud leader 314, selects a mobile device 318-320, e.g., mobile device 318, in its corresponding small cloud storage system 380, 390 to store the segment. The cloud leader 314 may maintain information for each of the mobile devices 318-320 with regard to the amount of memory each mobile device 318-320 has available to store segments, whether a mobile device's memory is full and cannot continue to participate, or the like. Such information may be communicated back to the cloud leader 314 in acknowledgement messages returned by the mobile device 318-320 when acknowledging storage of a recording segment. The mobile devices 318-320 themselves may implement logic for storing the segments in the allocated portions of their memory for use in ad hoc cloud storage systems and which may report to the cloud leader 314 when this portion of memory becomes full.

In addition to logic for storing the segments of recorded data transmitted to them, and for reporting memory availability to the cloud leader 313, 314, the mobile devices 315-320 of the small ad hoc cloud storage systems 380, 390 may also comprise logic for determining when a data connection is available for uploading the segments to a remote server 340 of the dynamic ad hoc cloud storage system service for retrieval by the initiating mobile device 310. If such a connection is available, then the mobile device 315-320 may initiate upload of the segments stored in the allocated portion of the mobile device's memory that stores these segments. If such a connection is not available, then the segments may be maintained in the allocated memory of the mobile device 315-320 until such a connection is available. As segments are successfully uploaded to the remote server 340, the portion of memory of the mobile device 315-320 allocated for use with dynamic ad hoc cloud storage system is freed and can be reused for subsequent requests to generate dynamic ad hoc cloud storage systems.

At the remote server 340 of the dynamic ad hoc cloud storage system service, the server 340 collects the various segments of recording data and compiles them into a single recording data file, or series of data files, arranged in accordance with the indexes of the segments so as to place the segments back into a correct chronological order of the recording. Once all of the segments are compiled in this manner, the remote server 340 may store the compiled recording data file(s) in the remote storage system 360 and notify the initiating mobile device 310 that the complete recording is available for download. Since the segments are encrypted by the initiating mobile device, the initiating mobile device may decrypt the compiled recording data file(s) to obtain access to the entire recording. Also, since the segments are encrypted by the initiating mobile device 310, the other mobile devices 311-320 which are provided with the segments of the recording data may temporarily store the segments, but may not be able to access the recording data due to these mobile devices 311-320 not having the appropriate decryption keys for accessing the recording data. Hence, ownership of the recording data always lies with the initiating (or originating) mobile device 310 with only temporary possession of the data being provided to the mobile devices 311-320.

Thus, with the mechanisms of the illustrative embodiments, the mobile devices 310-320 within a local vicinity 300 of one another are dynamically combined into a local ad hoc cloud storage system in which storage of recording files may be distributed across the plurality of mobile devices 310-320 making up the dynamically generated ad hoc cloud storage system. The mobile devices 310-320 that are part of the dynamically generated ad hoc cloud storage system pool their memory resources such that the combined memory may be utilized as needed by the mobile devices 310-320 that are participating in the dynamic ad hoc cloud storage system. Such use of a dynamically generated ad hoc cloud storage system may be performed in response to a determination that a previously configured wide area network cloud service is not available or a data connection to such a wide area network cloud services is not available, e.g., the mobile device does not have a sufficiently strong wireless connection such as a 3G network connection, WiFi network connection, or the like. As a result, the limited memory sizes of the mobile devices 310-320 no longer are a limitation on the amount of recording data that may be captured and stored by the mobile devices 310-320 and the likelihood of a loss of real-time event capture capabilities is minimized. As noted above, it should further be appreciated that various incentives may be offered to participants in dynamic ad hoc cloud storage systems to reward or entice owners of mobile devices to participate in the dynamic ad hoc cloud storage systems or to reward/entice owners of mobile devices to increase their participation in such dynamic ad hoc cloud storage systems, e.g., by increasing the amount of memory their corresponding mobile device contributes to the dynamic ad hoc cloud storage system. The various rewards/incentives may take many forms including, for example, financially charging the owner of the originating mobile device initiating the generation and usage of the dynamic ad hoc cloud storage system a fee for the service and then apportioning a part of that fee to the owners of the mobile devices participating in the dynamic ad hoc cloud storage system. The amount of apportionment may be based on the role of the mobile device in the dynamic ad hoc cloud storage system, e.g., cloud leader, distributor, participant, or the like, a level of involvement in the ad hoc cloud storage system, e.g., an amount of memory allocated to the ad hoc cloud storage system by the particular mobile device, or the like.

Furthermore, as noted above, it should also be appreciated that there may be times when multiple mobile devices in a local proximity to one another are attempting to make use of the same dynamic ad hoc cloud storage system services of the illustrative embodiments. Thus, demands for mobile devices to participate in multiple dynamic ad hoc cloud storage systems may be received for a same event being recorded. In such situations various methodologies may be utilized to arbitrate the competition for mobile device memory resources for use in the dynamic ad hoc cloud storage systems. For example, in one illustrative embodiment, an auction may be utilized to auction off the memory resources to an originating mobile device based on a specified level of financial compensation the owner of the originating mobile device is willing to pay for the memory resources of the mobile devices. Alternatively, such auctioning may be based on a specified need level of the originating mobile device, e.g., mobile devices requiring greater memory resources may be given dynamic ad hoc cloud storage system resources prior to originating mobile devices requiring less memory resources. Various other prioritization mechanisms may also be utilized, e.g., based on a specified account type of a user that owns the originating mobile device, or the like.

Figure 4:
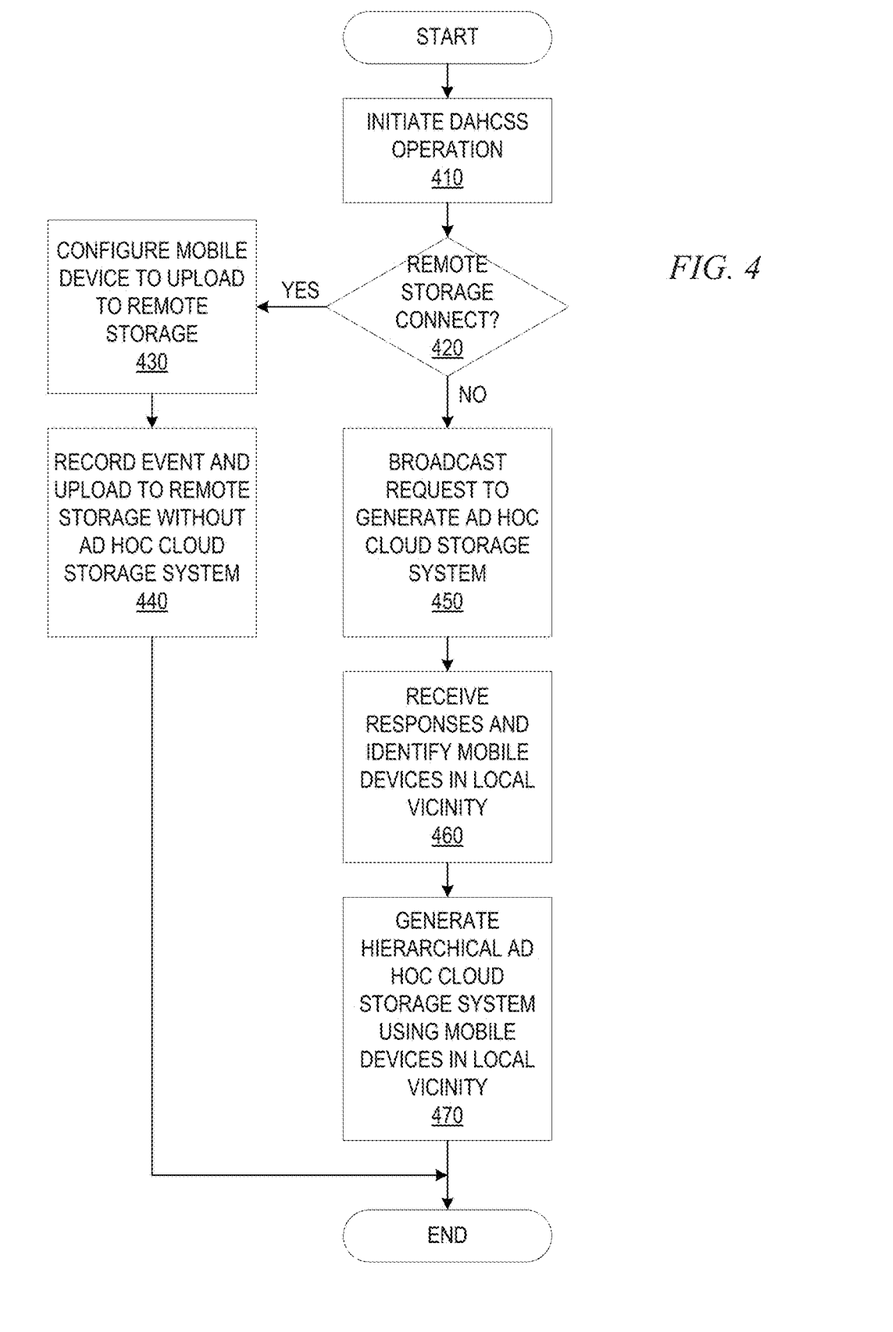
FIG. 4 is a flowchart outlining an example operation for dynamically establishing an ad hoc cloud storage system in accordance with one illustrative embodiment.

FIG. 4 is a flowchart outlining an example operation for dynamically establishing an ad hoc cloud storage system in accordance with one illustrative embodiment. It is assumed for purposes of the description of FIG. 4 that a plurality of mobile devices have already been registered with a dynamic ad hoc cloud storage system service provider and have indicated a desire to participate in dynamic ad hoc cloud storage systems. The operation outlined in FIG. 4 may be implemented, for example, by a software agent executing on hardware resources of a mobile device, e.g., mobile smart phone or the like.

As shown in FIG. 4, the operation starts with the initiation of a dynamic ad hoc cloud storage system (DAHCSS) operation of the mobile device (step 410). This initiation may be automatically performed in response to a user selecting a record option of the mobile device to thereby initiate recording of a real-time event, for example. In another illustrative embodiment, this initiation may be done in response to a user specifically selecting an option via a user interface of the mobile device to specifically generate a dynamic ad hoc cloud storage system. Other triggering conditions may also be used to initiate the generation of the dynamic ad hoc cloud storage system without departing from the spirit and scope of the illustrative embodiments.

In response to the initiation of the dynamic ad hoc cloud storage system operation, the mobile device determines if a connection to a remote storage system is available (step 420). This determination may involve, for example, determining if a connection to a cellular network, WiFi network, or the like, is available through which the remote storage system may be accessible. If such a connection is available, then the mobile device is configured to upload recording segments to the remote storage system via the connection to the remote storage system (step 430). Recording of the event is commenced with corresponding recording segments being uploaded to the remote storage system using a recording identifier and segment indexes in the manner previously described above (step 440). That is, rather than having to generate an ad hoc cloud storage system, since the mobile device has a connection to the remote storage system, the recording data may be directly uploaded to the remote storage system via the connection. The same segmentation of the recording data may still be utilized with the segment indices being used to recreate the full recording at the remote storage system, but without having to distribute segment recordings to multiple mobile devices via an ad hoc cloud storage system.

If a connection to the remote storage system is not available, then a request is broadcast, using a small range localized communication protocol, to other mobile devices within a localized vicinity, requesting that mobile devices configured to participate in an ad hoc cloud storage system respond to the request (step 450). Responses to the request are received and used to identify which mobile devices within the local vicinity are configured to participate in the ad hoc cloud storage system (step 460). From the identification of these mobile devices, a hierarchical ad hoc cloud storage system is dynamically generated with one or more mobile devices operating as a dispatcher, one or more mobile devices operating as a cloud leader, and one or more mobile devices operating as members of the ad hoc cloud storage system (step 470). The dynamically generated ad hoc cloud storage system is then available for use and the operation terminates.

Figure 5:
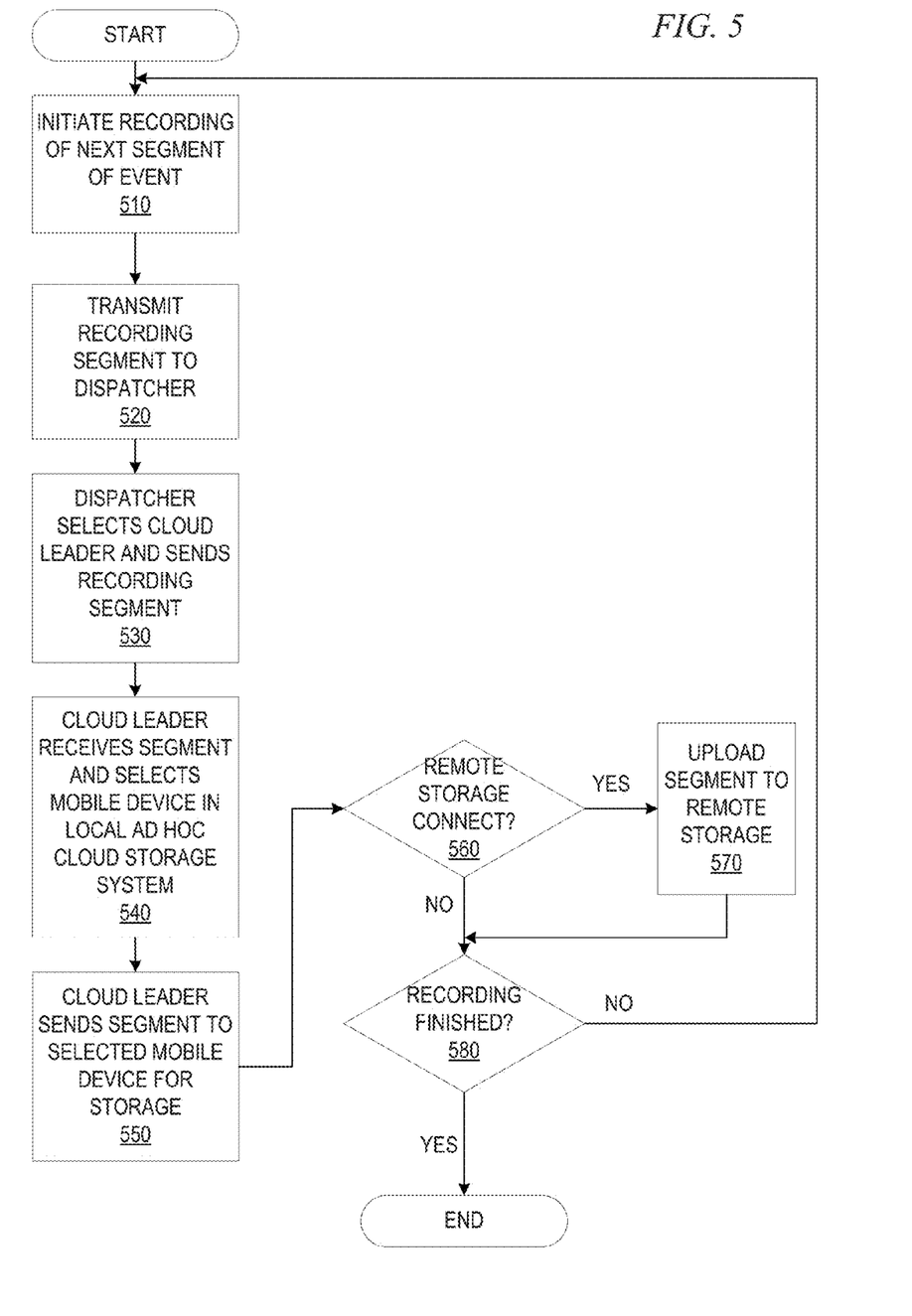
FIG. 5 is a flowchart outlining an example operation for utilizing a dynamically established ad hoc cloud storage system to store recording segments in a distributed manner.

FIG. 5 is a flowchart outlining an example operation for utilizing a dynamically established ad hoc cloud storage system to store recording segments in a distributed manner. The operation in FIG. 5 assumes that a hierarchical ad hoc cloud storage system has been dynamically generated, such as in accordance with the operation outlined in FIG. 4, for example. As shown in FIG. 5, the operation starts with the initiating mobile device recording a segment of recording data for a particular real-time event (step 510). As noted above, the segment comprises recording data, a recording identifier, and a segment index. The recording segment is transmitted by the initiating mobile device to a designated dispatcher mobile device (step 520). The dispatcher selects a cloud leader to send the recording segment to (step 530). This selection may utilize various logic to select between a plurality of available cloud leaders, or if only a single cloud leader is available, then that cloud leader is selected by default.

The cloud leader receives the recording segment and, based on current memory availability information for the member mobile devices of the small cloud storage system managed by the cloud leader, selects a mobile device in the small cloud storage system it manages to store the recording segment (step 540). The recording segment is then sent to the selected mobile device which stores the recording segment for later upload to a remote dynamic ad hoc storage system service provider server (step 550). A determination is made as to whether the selected mobile device has an available connection to the remote dynamic ad hoc storage system service provider server (step 560). If so, the mobile device uploads the stored recording segment to the remote dynamic ad hoc storage system service provider and frees the memory allocated for use in dynamic ad hoc storage systems (step 570). If not, the operation continues to step 580 where it is determined whether the recording has been completed. If the recording has not been completed, the operation returns to step 510 with the recording of a subsequent segment of recording data for the real-time event. If the recording has been completed, the operation terminates.

It should be appreciated that, although not shown in FIGS. 4 and 5, the remote dynamic ad hoc storage system service provider server receives the segments of recording data from the various mobile devices of the dynamically generated ad hoc cloud storage system and compiles the segments into one or more recording data files stored in a remote storage system. The compilation of these segments involves the recreation of the recording by organizing the segments according to the indices of the segments so that a correct chronological ordering of the segments is created. The remote dynamic ad hoc storage system service provider server may determine whether all segments of the recording are received by looking at the segment index which may specify whether the segment is a last segment of the recording or not, e.g., the recording option is no longer selected by the user of the initiating mobile device, thereby causing a termination of the recording. Once all segments are received by the remote dynamic ad hoc storage system service provider server and compiled into one or more files, the server may send a message to the initiating mobile device to indicate that the recording is complete and ready for download. The segments of the recording data may include an identifier of the initiating mobile device to facilitate this communication from the remote dynamic ad hoc storage system service provider server.

Thus, the illustrative embodiments provide mechanisms for dynamically generating an ad hoc cloud storage system comprised of a plurality of mobile devices in the local vicinity of an initiating mobile device. The mechanisms of the illustrative embodiments alleviate the problems in the prior art with regard to limited memory resources of mobile devices by pooling the memory resources of a plurality of mobile devices in a dynamic manner so as to provide increased storage capability. As a result, loss of capture of real-time events is minimized.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for providing a dynamically generated ad hoc cloud storage system of mobile devices, the method comprising:
    transmitting, by a mobile communication device, a request to dynamically generate an ad hoc cloud storage system, to mobile devices within a local vicinity of the mobile communication device;
    receiving, by the mobile communication device, one or more responses from one or more of the mobile devices within the local vicinity of the mobile communication device, wherein the one or more responses indicate that a corresponding mobile device is available to participate in the dynamically generated ad hoc cloud storage system;
    dynamically generating the ad hoc cloud storage system comprising memory resources of one or more mobile devices corresponding to the one or more responses and memory resources of the mobile communication device;
    capturing, by the mobile communication device, recording data of a real-time event; and
    distributing, by the mobile communication device, at least one first portion of the recording data to the one or more mobile devices for storage in memory resources of the one or more mobile devices, wherein at least one second portion of the recording data is maintained in the memory resources of the mobile communication device, such that the first portion and second portion comprise the recording data stored in a distributed manner within the ad hoc cloud storage system.

2. The method of claim 1, further comprising:
    uploading, by each mobile device in the one or more mobile devices, one or more segments of the at least one first portion of the recording data stored in the mobile device to a remote server in response to determining that the mobile device has an available communication connection to the remote server.

3. The method of claim 2, further comprising:
    downloading, by a user of the mobile communication device using either the mobile communication device or another computing device associated with the user of the mobile communication device, the one or more segments of the at least one first portion of the recording data uploaded to the remote server by the one or more mobile devices; and
    recreating the recording data from the one or more segments of the at least one first portion of the recording data by compiling the one or more segments of recording data into a single combined recording data file.

4. The method of claim 1, wherein the transmitting of the request comprises using a local transmission protocol having a limited range of transmission to the local vicinity of the mobile communication device.

5. The method of claim 1, wherein the one or more mobile devices are mobile devices previously registered with a dynamic ad hoc cloud storage system service provided by a dynamic ad hoc cloud storage system server and whose memory resources have been registered as shareable as part of a dynamic ad hoc cloud storage system.

6. The method of claim 1, further comprising:
    determining, by the mobile communication device, whether a communication connection to a remote storage system is available for uploading the recording data to the remote storage system, wherein the transmitting, receiving, automatically generating, and distributing operations are performed in response to results of the determination indicating that a communication connection to the remote storage system is not available.

7. The method of claim 1, wherein the one or more mobile devices are registered with a dynamic ad hoc cloud storage system service provided by a dynamic ad hoc cloud storage system server, and wherein registration of a mobile device comprises specifying a portion of memory resources of the mobile device that is shareable as part of a dynamic ad hoc cloud storage system server.

8. The method of claim 7, wherein the dynamically generated ad hoc cloud storage system is generated using memory resources of the one or more mobile devices corresponding to the one or more responses at least by pooling the specified portions of memory resources from each of the one or more mobile devices into a single dynamically generated ad hoc cloud storage system, and wherein other portions of the memory resources of the one or more mobile devices are not part of the dynamically generated ad hoc cloud storage system.

9. The method of claim 7, wherein a user of the mobile communication device pays a fee for the generating and usage of the dynamically generated ad hoc cloud storage system, and wherein a portion of the fee is apportioned to users of the one or more mobile devices as a reward for participating in the dynamically generated ad hoc cloud storage system.

10. The method of claim 1, wherein the dynamically generated ad hoc cloud storage system is generated using memory resources of the one or more mobile devices at least by dynamically generating a hierarchical ad hoc cloud storage system comprising participant mobile devices, at least one cloud leader mobile device, and at least one dispatcher mobile device, and wherein distributing the recording data to the one or more mobile devices comprises transmitting, by the mobile communication device, a segment of the recording data to the at least one dispatcher mobile device which dispatches the segment to the at least one cloud leader mobile device, and wherein the at least one cloud leader mobile device dispatches the segment of recording data to a participant mobile device of the dynamically generated ad hoc cloud storage system.

11. A computer program product comprising a computer readable storage medium having a computer readable program stored therein, wherein the computer readable program, when executed on a mobile communication device, causes the mobile communication device to:
    transmit a request to dynamically generate an ad hoc cloud storage system, to mobile devices within a local vicinity of the mobile communication device;
    receive one or more responses from one or more of the mobile devices within the local vicinity of the mobile communication device, wherein the one or more responses indicate that a corresponding mobile device is available to participate in the dynamically generated ad hoc cloud storage system;
    dynamically generate the ad hoc cloud storage system comprising memory resources of one or more mobile devices corresponding to the one or more responses and memory resources of the mobile communication device;
    capture recording data corresponding to a real-time event; and
    distribute at least one first segment of the recording data to the one or more mobile devices for storage in memory resources of the one or more mobile devices, wherein at least one second segment of the recording data is maintained in the memory resources of the mobile communication device, such that the first portion and second portion comprise the recording data stored in a distributed manner within the ad hoc cloud storage system.

12. The computer program product of claim 11, wherein each mobile device in the one or more mobile devices uploads one or more segments of the at least one first portion of the recording data stored in the mobile device to a remote server in response to determining that the mobile device has an available communication connection to the remote server.

13. The computer program product of claim 12, wherein a user of the mobile communication device downloads, using either the mobile communication device or another computing device associated with the user of the mobile communication device, the one or more segments of the at least one first portion of the recording data uploaded to the remote server by the one or more mobile devices, and recreates the recording data from the one or more segments of the at least one first portion of the recording data by compiling the one or more segments of recording data into a single combined recording data file.

14. The computer program product of claim 11, wherein the computer readable program further causes the mobile communication device to transmit the request using a local transmission protocol having a limited range of transmission to the local vicinity of the mobile communication device.

15. The computer program product of claim 11, wherein the one or more mobile devices are mobile devices previously registered with a dynamic ad hoc cloud storage system service provided by a dynamic ad hoc cloud storage system server and whose memory resources have been registered as shareable as part of a dynamic ad hoc cloud storage system.

16. The computer program product of claim 11, wherein the computer readable program further causes the mobile communication device to:
    determine whether a communication connection to a remote storage system is available for uploading the recording data to the remote storage system, wherein the transmitting, receiving, automatically generating, and distributing operations are performed in response to results of the determination indicating that a communication connection to the remote storage system is not available.

17. The computer program product of claim 11, wherein the one or more mobile devices are registered with a dynamic ad hoc cloud storage system service provided by a dynamic ad hoc cloud storage system server, and wherein registration of a mobile device comprises specifying a portion of memory resources of the mobile device that is shareable as part of a dynamic ad hoc cloud storage system server.

18. The computer program product of claim 11, wherein the dynamically generated ad hoc cloud storage system is generated using memory resources of the one or more mobile devices at least by dynamically generating a hierarchical ad hoc cloud storage system comprising participant mobile devices, at least one cloud leader mobile device, and at least one dispatcher mobile device, and wherein distributing the recording data to the one or more mobile devices comprises transmitting, by the mobile communication device, a segment of the recording data to the at least one dispatcher mobile device which dispatches the segment to the at least one cloud leader mobile device, and wherein the at least one cloud leader mobile device dispatches the segment of recording data to a participant mobile device of the dynamically generated ad hoc cloud storage system.

19. The method of claim 1, wherein the method further comprises:
    determining that an available storage capacity of a memory of the mobile communication device is equal to or below a predetermined threshold available storage capacity; and initiating the transmitting, receiving, dynamically generating, and distributing operations in response to the determination.

20. An apparatus comprising:

a processor; and a memory coupled to the processor, wherein the memory comprises instructions which, when executed by the processor, cause the processor to:

transmit a request to dynamically generate an ad hoc cloud storage system, to mobile devices within a local vicinity of the mobile communication device;

receive one or more responses from one or more of the mobile devices within the local vicinity of the mobile communication device, wherein the one or more responses indicate that a corresponding mobile device is available to participate in the dynamically generated ad hoc cloud storage system;

dynamically generate the ad hoc cloud storage system comprising memory resources of one or more mobile devices corresponding to the one or more responses and memory resources of the mobile communication device;

capture recording data corresponding to a real-time event; and distribute at least one first segment of the recording data to the one or more mobile devices for storage in memory resources of the one or more mobile devices, wherein at least one second segment of the recording data is maintained in the memory resources of the mobile communication device, such that the first portion and second portion comprise the recording data stored in a distributed manner within the ad hoc cloud storage system.

* * * * *